United States Patent
Chu et al.

(10) Patent No.: US 11,342,591 B2
(45) Date of Patent: May 24, 2022

(54) APPARATUS AND METHOD FOR MANUFACTURING ELECTRODE ASSEMBLY

(71) Applicant: LG CHEM, LTD., Seoul (KR)

(72) Inventors: Il Un Chu, Daejeon (KR); Sang Wook Kim, Daejeon (KR); Dong Hyeuk Park, Daejeon (KR); Nam Hyuck Kim, Daejeon (KR); Su Ho Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 360 days.

(21) Appl. No.: 16/615,345

(22) PCT Filed: Oct. 31, 2018

(86) PCT No.: PCT/KR2018/013088
§ 371 (c)(1),
(2) Date: Nov. 20, 2019

(87) PCT Pub. No.: WO2019/164091
PCT Pub. Date: Aug. 29, 2019

(65) Prior Publication Data
US 2020/0203774 A1    Jun. 25, 2020

(30) Foreign Application Priority Data
Feb. 20, 2018 (KR) .......................... 10-2018-0019991

(51) Int. Cl.
*H01M 10/0585* (2010.01)
*H01M 50/403* (2021.01)
(Continued)

(52) U.S. Cl.
CPC ... *H01M 10/0585* (2013.01); *H01M 10/0468* (2013.01); *H01M 50/403* (2021.01); *H01M 50/46* (2021.01); *H01M 50/463* (2021.01)

(58) Field of Classification Search
CPC ........................ H01M 10/0585; H01M 50/403
See application file for complete search history.

(56) References Cited

U.S. PATENT DOCUMENTS

| | | | |
|---|---|---|---|
| 2012/0141862 A1 | 6/2012 | Schaefer et al. | |
| 2014/0033883 A1 | 2/2014 | Yuhara et al. | |

(Continued)

FOREIGN PATENT DOCUMENTS

| | | |
|---|---|---|
| CN | 103733417 A | 4/2014 |
| CN | 104604015 A | 5/2015 |

(Continued)

OTHER PUBLICATIONS

International Search Report issued in PCT/KR2018/013088 (PCT/ISA/210), dated Feb. 8, 2019.

(Continued)

*Primary Examiner* — Matthew J Merkling
(74) *Attorney, Agent, or Firm* — Birch, Stewart, Kolasch & Birch, LLP

(57) ABSTRACT

A method for manufacturing an electrode assembly is provided. The method includes a preparation step of preparing a plurality of separators and a plurality of electrodes; an electrode unit manufacturing step of manufacturing an electrode unit having a structure in which the separators and the electrodes are alternately disposed; a pre-sealing step of forming a pre-sealing part in which at least a partial region of each separator of the plurality of separators within the electrode unit are attached to each other; and a separator cutting step of cutting a region of the pre-sealing part. An apparatus for performing the method is also provided.

8 Claims, 10 Drawing Sheets

(51) Int. Cl.
*H01M 10/04* (2006.01)
*H01M 50/463* (2021.01)
*H01M 50/46* (2021.01)

(56) References Cited

U.S. PATENT DOCUMENTS

| | | | |
|---|---|---|---|
| 2014/0106206 A1 | 4/2014 | Kwon et al. | |
| 2014/0272537 A1 | 9/2014 | Kretschmar et al. | |
| 2014/0349192 A1* | 11/2014 | Park | H01M 10/0468 429/246 |
| 2015/0033547 A1 | 2/2015 | Yang et al. | |
| 2015/0372353 A1 | 12/2015 | Ryu et al. | |
| 2016/0043369 A1* | 2/2016 | Zeng | H01M 50/403 62/62 |
| 2019/0181505 A1* | 6/2019 | Otsuka | H01M 50/463 |

FOREIGN PATENT DOCUMENTS

| | | |
|---|---|---|
| EP | 2 696 390 A | 2/2014 |
| JP | 2000-182594 A | 6/2000 |
| JP | 2013-161631 A | 8/2013 |
| JP | 2014-179217 A | 9/2014 |
| JP | 2016-219269 A | 12/2016 |
| KR | 20-0244344 Y1 | 10/2001 |
| KR | 10-2012-0040131 A | 4/2012 |
| KR | 10-2013-0086483 A | 8/2013 |
| KR | 10-2014-0029921 A | 3/2014 |
| KR | 10-2015-0134683 A | 12/2015 |
| KR | 10-2017-0072487 A | 6/2017 |
| KR | 10-2017-0112394 A | 10/2017 |
| KR | 10-2017-0138636 A | 12/2017 |
| KR | 10-2018-0013378 A | 2/2018 |
| WO | WO 2014/137017 A1 | 9/2014 |
| WO | WO 2018/021589 A1 | 2/2018 |

OTHER PUBLICATIONS

Supplementary European Search Report dated in EP Application No. 18907419.8 dated Jul. 14, 2020.

* cited by examiner

APPARATUS AND METHOD FOR MANUFACTURING ELECTRODE ASSEMBLY

CROSS-REFERENCE TO RELATED APPLICATION

The present application claims the benefit of the priority of Korean Patent Application No. 10-2018-0019991, filed on Feb. 20, 2018, which is hereby incorporated by reference in its entirety.

TECHNICAL FIELD

The present invention relates to an apparatus and method for manufacturing an electrode assembly, and more particularly, to an apparatus and method for manufacturing an electrode assembly, which have improved productivity when compared to an apparatus and method for manufacturing an electrode assembly according to the related art.

BACKGROUND ART

As the demands for electronic devices increase, the demands for secondary batteries, which are accommodated in electronic devices and repeatedly chargeable and dischargeable, also increase.

Particularly, as the electronic device is diversified in shape, and the capacity required for the electronic device increases, it is required to deviate from the conventional shape of the secondary battery so as to be mounted in an irregular space within the electronic device and to maximize the capacity. Various studies for effectively manufacturing the secondary batteries having irregular shapes are being conducted.

In order to manufacture such an irregular secondary battery, it is necessary to manufacture an electrode assembly having an irregular shape corresponding to the irregular secondary battery.

According to the related art, in order to manufacture the electrode assembly having the irregular shape, a separator (generally, the separator has a rectangular shape) and an electrode having an irregular shape are provided and then are laminated to manufacture an electrode unit. Thereafter, a partial region of the separator may also be cut to have a shape corresponding to that of the electrode, thereby manufacturing an electrode assembly having an irregular shape.

However, according to the related art, while the partial region of the separator is cut, the number of separators to be cut may be limited. That is, in the case in which the electrode unit is constituted by a large number of separators, while the partial region of the separator is cut, the separator may not be properly cut, or the cut point is deteriorated in quality.

Thus, according to the related art, the electrode unit in which the partial region of the separator is cut may be constituted by only a relatively small number of electrodes and separators. However, the electrode assembly used for the secondary battery is constituted by a relatively large number of electrodes and separators. As a result, according to the related art, since a large number of electrode units in which the partial region of the separator is cut is required to manufacture the electrode assembly, there is a problem that excessive equipment and manufacturing time are required for manufacturing the electrode assembly having the irregular shape.

DISCLOSURE OF THE INVENTION

Technical Problem

Thus, an object of the present invention is to reduce equipment and manufacturing time, which are required for manufacturing an electrode assembly by simplifying a process of manufacturing the electrode assembly.

Technical Solution

To achieve the above object, a method for manufacturing an electrode assembly according to an aspect of the present invention includes: a preparation step of preparing a plurality of separators and a plurality of electrodes; an electrode unit manufacturing step of manufacturing an electrode unit having a structure in which the separators and the electrodes are alternately disposed; a pre-sealing step of forming a pre-sealing part in which at least a partial region of each separator of the plurality of separators within the electrode unit are attached to each other; and a separator cutting step of cutting a region of the pre-sealing part.

In the preparation step, a concave part may be formed in each electrode of the plurality of electrodes, in the pre-sealing step, the pre-sealing part may be formed on at least a portion of the plurality of separators covering the concave parts of the plurality of electrodes, and in the separator cutting step, a concave part may be formed in each separator of the plurality of separators, the concave parts of the plurality of separators correspond to the concave parts of the plurality of electrodes.

In the pre-sealing step, upper and lower portions of the electrode unit may be pressed at the same time to form the pre-sealing part.

The method may further include a side sealing step of bonding the plurality of separators cut in the separator cutting step to each other.

The separator cutting step may be performed in a state in which the pre-sealing part is disposed to be spaced downward from a virtual surface extending from an uppermost surface of the electrode unit and be disposed to be spaced upward from a virtual surface extending from a lowermost surface of the electrode unit.

In the pre-sealing step, an upper pressing device and a lower pressing device, each having a bar shape, may be provided, and one end of each of the upper pressing device and the lower pressing device may press a region of the plurality of separators adjacent to the concave parts of the plurality of electrodes.

A recess part having a recessed shape may be formed in each of the concave parts of the plurality of electrodes, and, in the pre-sealing step, each of the one ends of the upper pressing device and the lower pressing device may have a curved surface having a curvature corresponding to that of the recess parts of the concave parts of the plurality of electrodes.

In the pre-sealing step, the upper pressing device may press an upper portion of the electrode unit while moving downward from an upper side of the electrode unit toward a center of the electrode unit in a thickness direction, and the lower pressing unit may press a lower portion of the electrode unit while moving upward from a lower side of the electrode unit toward the center of the electrode unit in the thickness direction.

To achieve the above object, an apparatus for manufacturing an electrode assembly according to another aspect of the present invention includes: an electrode unit manufacturing device configured to manufacture an electrode unit having a plurality of separators and a plurality of electrodes where the separators and electrodes are alternately disposed; a pre-sealing device configured to attach at least a partial region of each separator of the plurality of separators within the electrode unit to each other to from a pre-sealing part; and a separator cutting device configured to cut a region of the pre-sealing part.

Each electrode of the plurality of electrodes may include a concave part, the pre-sealing device may be configured to form the pre-sealing part on at least a portion of the plurality of separators covering the concave parts of the plurality of electrodes, and the separator cutting device may be configured to form a concave part in each separator of the plurality of separators, the concave parts of the plurality of separators corresponding to the concave parts of the plurality of electrodes.

The apparatus may further include a side sealing device configured to bond the plurality of separators cut by the separator cutting device to each other.

The apparatus may further include a support device to support the electrode unit and the pre-sealing part, in which the support device may include: a first support surface supporting a bottom surface of the electrode unit; and a second support surface stepped with respect to the first support surface and protruding upward to support the pre-sealing part.

The pre-sealing device may include: an upper pressing device configured to press an upper portion of the electrode unit; and a lower pressing device configured to press a lower portion of the electrode unit, each of the upper pressing device and the lower pressing device may have a bar shape, and one end of each of the upper pressing device and the lower pressing device may be configured to press a region of the plurality of separators adjacent to the concave parts of the plurality of electrodes.

A recess part having a recessed shape may be formed in each of the concave parts of the plurality of electrodes, and each of the one ends of the upper pressing part and the lower pressing part may have a curved surface having a curvature corresponding to the recess parts of the concave parts of the plurality of electrodes.

The upper pressing device may be configured to press the upper portion of the electrode unit while moving downward from an upper side of the electrode unit toward a center of the electrode unit in a thickness direction, and the lower pressing unit may be configured to press the lower portion of the electrode unit while moving upward from a lower side of the electrode unit toward the center of the electrode unit in the thickness direction.

Advantageous Effects

According to the present invention, the process of manufacturing the electrode assembly may be simplified to reduce the equipment and manufacturing time.

MODE FOR CARRYING OUT THE INVENTION

Hereinafter, a method for manufacturing an electrode assembly according to the present invention will be described with reference to the accompanying drawings.

Method for Manufacturing Electrode Assembly

Figure 1:
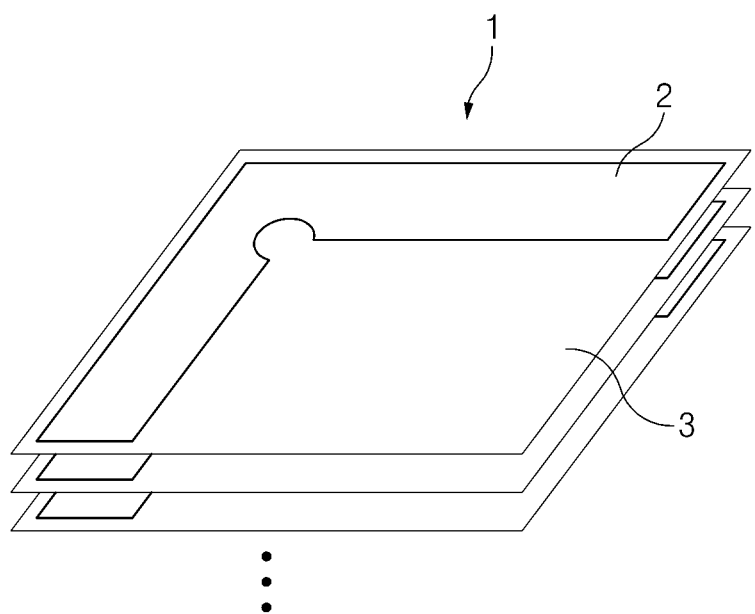
FIG. 1 is a perspective view of an electrode unit manufactured according to an electrode unit manufacturing step in a method for manufacturing an electrode assembly according to the present invention.

FIG. 1 is a perspective view of an electrode unit manufactured according to an electrode unit manufacturing step in a method for manufacturing an electrode assembly according to the present invention.

Referring to FIG. 1, a method for manufacturing an electrode assembly according to an embodiment of the present invention may include a preparation step of preparing an electrode 2 and a separator 3 and an electrode unit manufacturing step of manufacturing an electrode unit 1 having a structure in which the electrode 2 and the separator 3 are alternately disposed. Each of the electrode 2 and the separator 3 may have a sheet shape.

Figure 2:
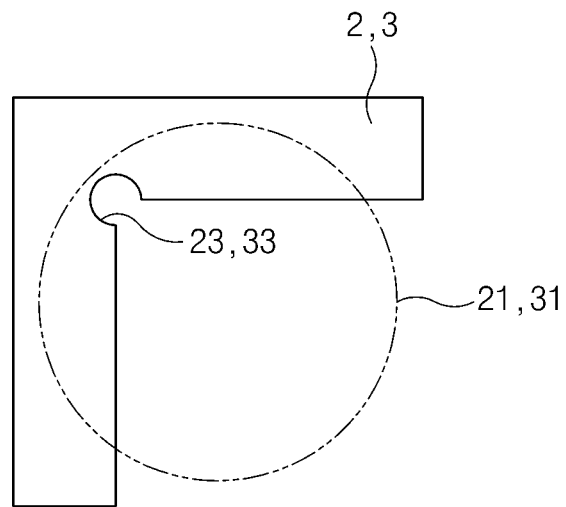
FIG. 2 is a plan view illustrating an example of shapes of an electrode and a separator, which are used in the method for manufacturing the electrode assembly according to the present invention.

In the preparation step, the electrode 2 may not have a rectangular shape or a circular shape but have an irregular shape. For example, as illustrated in FIG. 2, a concave part (hereinafter, referred to as an 'electrode concave part') may be formed in the electrode 2. For example, the electrode 2 may have an L shape.

Subsequently, referring to FIG. 2, a recess part 23 (hereinafter, referred to as an 'electrode recess part') having a recessed shape that is curved toward the electrode 2 may be formed in the electrode concave part 21 of the electrode 2.

In the electrode unit manufacturing step, the separator 3 of the manufactured electrode unit 1 may cover all of a top surface and a bottom surface of the electrode 2. Here, that 'the separator covers all of the top and bottom surfaces of the electrode' may mean that the separator has an area greater than that of the electrode as well as that a circumferential portion of the separator covers circumferential portions of all the electrodes when viewed from an upper or lower side in a thickness direction of the electrode unit.

As described below, after the separator cutting step, the separator 3 may have a shape corresponding to that of the electrode. Thus, referring to FIG. 2, similar to the case of the electrode 2, after the separator cutting step, a concave part 31 (hereinafter, referred to a 'separator concave part') may also formed in the separator 3, and a recess part 33 (hereinafter, referred to as a 'separator recess part') having a recessed shape that is curved toward the separator 3 may also be formed in the separator concave part 31. In addition, after the separator cutting step, the separator 3 may have an L shape.

Figure 6:
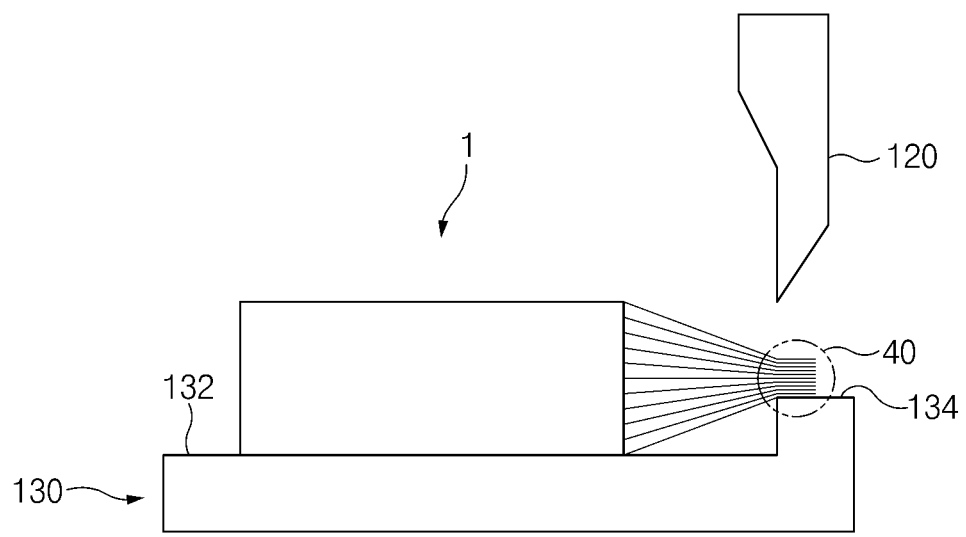
FIG. 6 is a side cross-sectional view illustrating a state in which a pre-sealing part is supported by a support device having a stepped portion in a separator cutting step of the method for manufacturing the electrode assembly according to the present invention.

The method for manufacturing the electrode assembly according to the present invention may include a pre-sealing step of attaching at least partial regions of the plurality of separators within the electrode unit 1 to each other to form a pre-sealing part 40 (see FIG. 6).

In order to manufacture the electrode assembly having the irregular shape, in the separator cutting process, if only a partial region of the separator is cut after the electrode and the separator are only laminated alternately, the number of separators that is capable of being cut may be significantly limited.

The present invention may provide a method for solving the above problem. That is, according to the present invention, after the electrode and the separator are alternately laminated to manufacture the electrode unit, partial regions of the separators are attached to each other, and then, a partial region of the separator is cut. Thus, when compared to the related art, a large number of separators may be cut at once. Therefore, in the process of manufacturing the electrode assembly by using the electrode unit, the number of processes of cutting the partial region of the separator may be reduced to increase in manufacturing rate of the electrode assembly.

In the pre-sealing step, the pre-sealing part 40 may be formed in a partial region of the separator 3. As described above, the electrode concave part 21 may be formed in the electrode 2. According to the present invention, the pre-sealing part may be formed at a portion or whole of the region of the separator 3, which covers the electrode concave part 21.

In the pre-sealing step, the pre-sealing part 40 may be formed by pressing an upper or lower portion of the electrode unit 1. For example, the pre-sealing part 40 may be formed by pressing the upper and lower portions of the electrode unit 1 at the same time.

Figure 3:
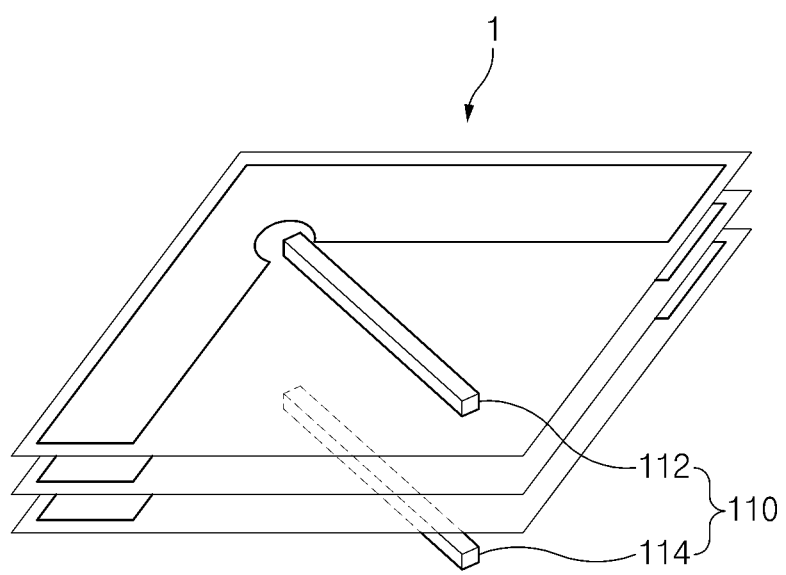
FIG. 3 is a perspective view illustrating a state in which a pre-sealing step is being performed in the method for manufacturing the electrode assembly according to the present invention.
Figure 4:
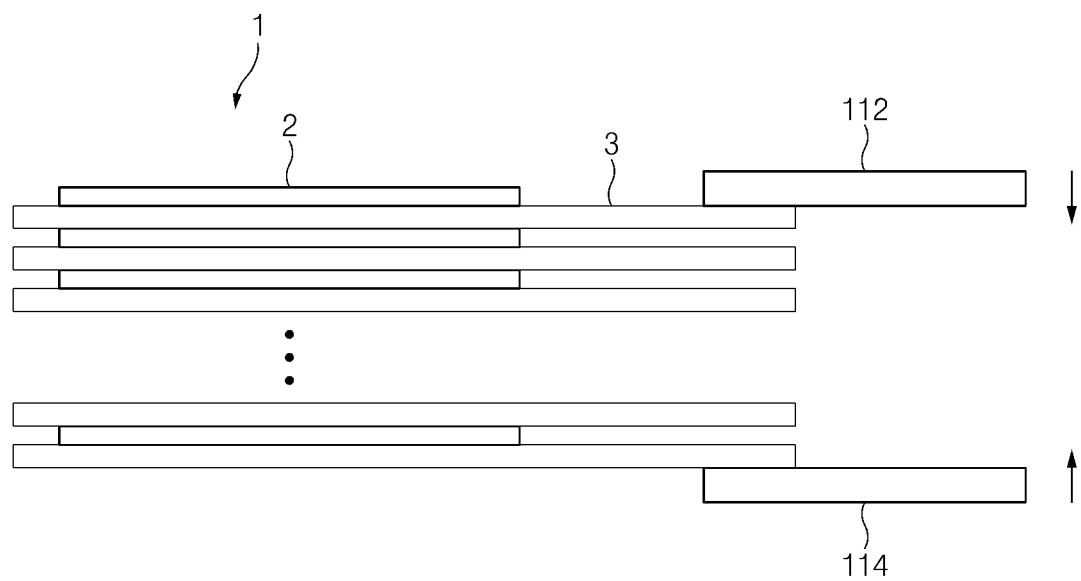
FIG. 4 is a side cross-sectional view illustrating a state in which the pre-sealing step is being performed in the method for manufacturing the electrode assembly according to the present invention.

FIG. 3 is a perspective view illustrating a state in which the pre-sealing step is performed in the method for manufacturing the electrode assembly according to the present invention, and FIG. 4 is a cross-sectional view illustrating a state in which the pre-sealing step is being performed.

As illustrated in FIGS. 3 and 4, the pre-sealing step may be performed by a pre-sealing device 110 that presses the upper or lower portion of the electrode unit 1. FIGS. 3 and 4 illustrate an upper pressing device 112 pressing the upper portion of the electrode unit 1 and a lower pressing device 114 pressing the lower portion of the electrode unit 1 in the pre-sealing step as the pre-sealing device 110. However, unlike FIGS. 3 and 4, the pre-sealing device 110 may include only the upper pressing device or may include only the lower pressing device.

The upper pressing device 112 or the lower pressing device 114 may have a flat area corresponding to each of the top and bottom surfaces of the electrode unit 1. In the pre-sealing step, the upper pressing device 112 may move downward, and the lower pressing device 114 may move upward. The flat area may press the upper or lower portion of the electrode unit 1 to form the pre-sealing part.

Figure 5:
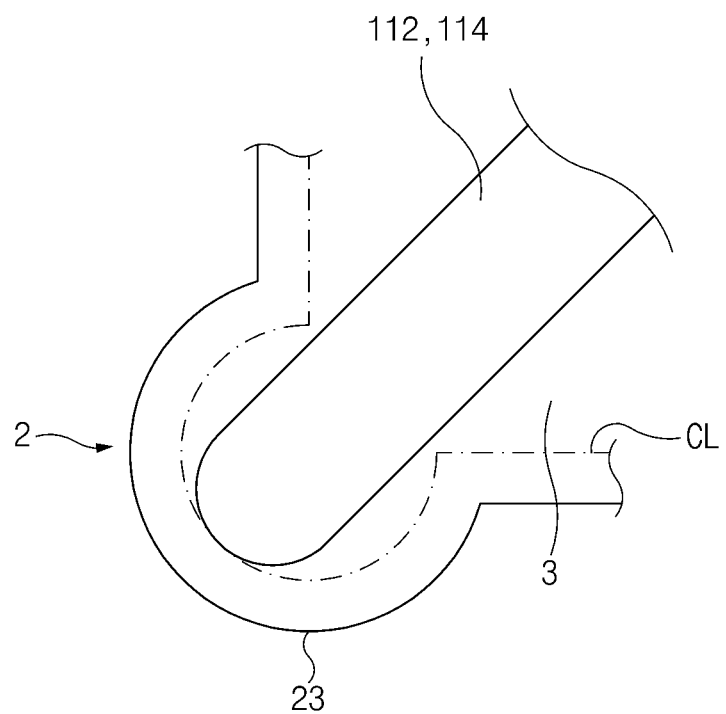
FIG. 5 is an enlarged plan view illustrating a state in which one end of a pressing device is disposed in the pre-sealing step of the method for manufacturing the electrode assembly according to the present invention.

FIG. 5 is an enlarged plan view illustrating a state in which one end of the pressing device is disposed in the pre-sealing step of the method for manufacturing the electrode assembly according to the present invention.

Also, as illustrated in FIGS. 3 to 5, the upper pressing device 112 or the lower pressing device 114 may have a bar shape. Here, in the pre-sealing step, one end of the upper pressing device 112 and one end of the lower pressing device 114 may press a region of the separator 3 of the electrode unit 1, which is adjacent to the electrode concave part 21 of the electrode 2.

Also, as illustrated in FIG. 5, the one end of the upper pressing device 112 and one end of the lower pressing device 114, which respectively press the regions adjacent to the electrode concave part 21, may have a curved shape. Since the curved shape is provided, the separator may be prevented from being damaged by the upper pressing device and the lower pressing device in the pre-sealing step. For example, a curved surface having a curvature corresponding to that of the electrode recess part 23 may be formed in the one end of the upper pressing device 112 and the one end of the lower pressing device 114, which press the regions adjacent to the electrode concave part 21. Thus, in the pre-sealing step, a region of the pre-sealing part formed by attaching the separators to each other, which faces the electrode recess part 23, may have a shape corresponding to that of the electrode recess part 23.

As described above, in the pre-sealing step, the upper pressing device 112 or the lower pressing device 114 may press the partial region of the separator to form the per-sealing part. When the partial region of the separator is pressed only upward or downward in the pre-sealing step, the pre-sealing part may be formed biased to one side in the thickness direction of the electrode unit. For example, in the pre-sealing step, when the partial region of the separator is pressed only downward, the pre-sealing part may be formed biased downward in the thickness direction of the electrode unit. When the pre-sealing part is biased to one side, the separators may also be biased to one side so that the pre-sealing part has remarkably asymmetry. As a result, in the separator cutting step, cutting quality in a region in which the separator is cut may be deteriorated.

Thus, as illustrated in FIG. 4, according to the present invention, in the pre-sealing step, the upper pressing device 112 may press the upper portion of the electrode unit 1 while moving downward from an upper side of the electrode unit 1 toward a center of the electrode unit 1 in the thickness direction, and the lower pressing unit 114 may press the lower portion of the electrode unit 1 while moving upward from a lower side of the electrode unit 1 toward the center of the electrode unit 1 in the thickness direction. In this case, since the pre-sealing part 40 (see FIG. 6) is formed at a central portion in the thickness direction of the electrode unit and has symmetry, the cutting quality in the region in which the separator is cut may be improved in the separator cutting step.

According to the present invention, the method for manufacturing the electrode assembly may further include the separator cutting step of cutting a portion of the separator, which is preformed after the pre-sealing step. The region of the separator, which is cut in the separator cutting step, may include the pre-sealing part formed in the pre-sealing step.

Figure 7:
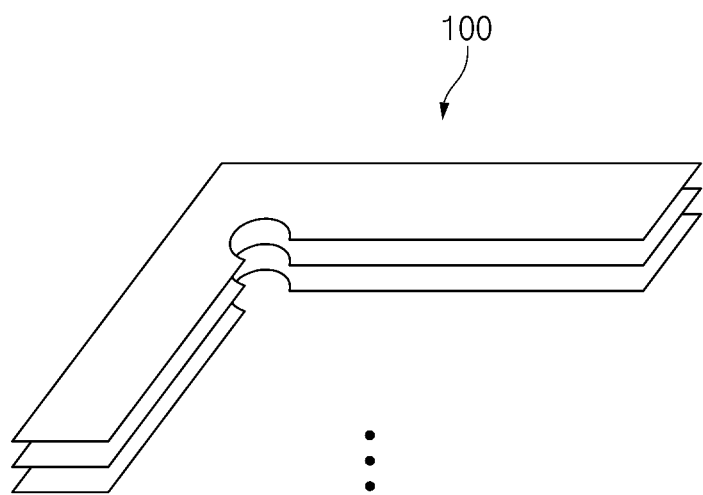
FIG. 7 is a perspective view illustrating an example of an electrode assembly manufactured according to the method for manufacturing the electrode assembly according to present invention.

In the separator cutting step, the separator may have a shape corresponding to that of the electrode. Thus, as illustrated in FIG. 7, after the separator cutting step, the separator concave part 31 (see FIG. 3) may be formed in the separator of the electrode assembly 100, and the electrode concave part and the separator concave part may face each other. Also, after the separator cutting step, the separator recess part 33 (see FIG. 2) may be formed in the separator of the electrode assembly 100, and the electrode recess part and the separator recess part may face each other.

Figure 8:
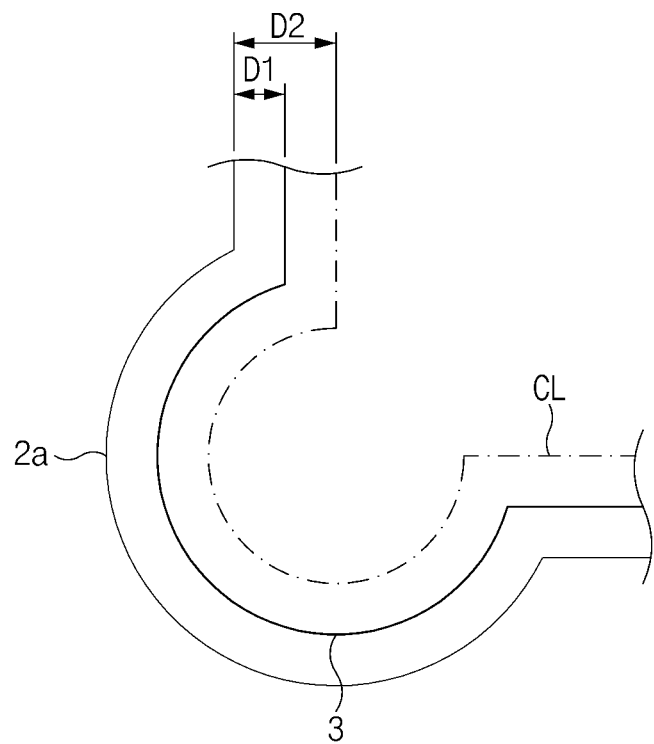
FIG. 8 is an enlarged plan view of a point at which the separator is cut after the separation cutting step of the method for manufacturing the electrode assembly according to present invention.

Here, in order to prevent a positive electrode and a negative electrode, which constitute the electrode, from directly contacting each other, in the separator cutting step, the separator 3 may cover all regions of a negative electrode 2a as illustrated in FIG. 8. Thus, as illustrated in FIG. 5, in the separator cutting step, a separation cutting line CL that is a virtual line along which the separator is cut may be formed to be spaced outward from the circumferential portion of the electrode.

FIG. 6 is a side cross-sectional view illustrating a state in which the pre-sealing part is supported by a support device having a stepped portion in the method for manufacturing the electrode assembly according to the present invention.

As illustrated in FIG. 6, in the separator cutting step, the electrode unit 1 is supported by a support device 130, and then, the pre-sealing part 40 is cut by the separator cutting device 120.

The pre-sealing step may include a process (hereinafter, referred to as a 'stop process') of stopping movement of the upper pressing device 112 or the lower pressing device 114 to allow the pre-sealing device to continuously press the electrode unit and a process (hereinafter, referred to as a 'return process') of allowing the upper pressing device 112 or the lower pressing device 113 to move again so that the upper pressing device 112 or the lower pressing device 114 returns to its original position in addition to the process (hereinafter, referring to a 'moving process') of allowing the upper pressing device 112 or the lower pressing device 114 to move.

Here, when the pre-sealing device 110 includes all of the upper pressing device 112 and the lower pressing device 114, a distance at which each of the upper pressing device 112 and the lower pressing device 114 moves in the moving process may be 0.4 to 0.5 of a thickness of the electrode unit before the pre-sealing step. For example, in the moving process, a moving distance of each of the upper pressing device 112 and the lower pressing device 114 may be 0.43 to 0.44 of the thickness of the electrode unit before the pre-sealing step.

In the pre-sealing process, the sum of times taken to perform the moving process, the stop process, and the return process may be 4 seconds to 6 seconds. For example, the sum of times taken to perform the moving process, the stop process, and the return process may be 4.5 seconds to 5.5 seconds.

Also, in the pre-sealing step, a ratio of a thickness of the pre-sealing part formed in the pre-sealing step to the thickness of the electrode unit may be 0.8 to 0.9. For example, in the pre-sealing step, a ratio of a thickness of the pre-sealing part formed in the pre-sealing step to the thickness of the electrode unit may be 0.8 to 0.83.

In the pre-sealing step, the pre-sealing device 110 may have a temperature of 110 degrees Celsius to 130 degrees Celsius. For example, in the pre-sealing step, the pre-sealing device 110 may have a temperature of 115 degrees Celsius to 125 degrees Celsius.

As described above, in the pre-sealing step, the pre-sealing part may be formed at the central portion in the thickness direction of the electrode unit. This may be understood that the pre-sealing part is disposed to be spaced downward from a virtual surface extending from the uppermost surface of the electrode unit and is disposed to be spaced upward from a virtual surface extending from the lowermost surface of the electrode unit (see FIG. 6). Thus, the separator cutting step may be performed in the state in which the pre-sealing part is disposed to be spaced downward from the virtual surface extending from the uppermost surface of the electrode unit and is disposed to be spaced upward from the virtual surface extending from the lowermost surface of the electrode unit. In this case, as illustrated in FIG. 6, when the electrode unit 1 is disposed on the support device 130, the pre-sealing part 40 may be spaced upward from a first support surface 132 supporting the bottom surface of the electrode unit in the support device 130. In this state, when the separator cutting step is performed, the pre-sealing part may not be fixed to deteriorate cutting quality in the cutting region.

Thus, according to the present invention, in the separator cutting step, the support device 130 may include the first support surface 132 supporting the bottom surface of the electrode unit 1 and a second support surface 134 stepped with respect to the first support surface 132 and protruding upward to support the pre-sealing part 110. Since the support device is formed as described above, the pre-sealing part may be fixed in the separator cutting step to improve the cutting quality in the cutting region.

It is preferable that the circumferential part of the separator covers the circumferential portion of the electrode so that the separator covers all the regions of the separator in the electrode unit. When the separator of the electrode unit does not cover the all the regions of the electrode, the positive electrode and the negative electrode, which face each other with the separator therebetween, may contact each other. In this case, short circuit may occur to cause a serious safety problem. Thus, it is preferable that the separator cover all the regions of the electrode in the electrode unit after the separator cutting step according to the present invention.

Also, the present invention may be applied to an electrode assembly used for a lithium secondary battery. In this case, in the relationship between the negative electrode and the positive electrode, which face each other with the separator therebetween, if the negative electrode does not cover all regions of the positive electrode, lithium ions may be extracted. Thus, the positive electrode and the negative electrode may be provided so that the circumferential portion of the negative electrode surrounds the circumferential portion of the positive electrode to allow the negative electrode to cover all the regions of the positive electrode.

Thus, in summary of the above contents, after the separator cutting step, the circumferential portion of the separator may be formed to surround the circumferential portion of the negative electrode in the electrode unit.

Here, as illustrated in FIG. 8, after the separator cutting step, if a horizontal distance (i.e., a distance between the circumferential portion of the separator and the circumferential portion of the negative electrode when the electrode unit is viewed from an upper side) between the circumferential portion of the separator and the circumferential portion of the negative electrode is D1, the distance D1 according to the present invention may be 0.5 mm or more in all regions of the electrode assembly. When the distance D1 is 0.5 mm or more, the safety problem due to direct contact between the electrodes may be solved.

In the separator cutting step, if a horizontal distance between the separation cutting line CL that is the virtual line along which the separator is cut and the circumferential portion of the negative electrode is D2, it is preferable that the distance D2 is greater than the distance D1. There may be a certain difference between the separator cutting line CL and the circumferential portion of the actual separator after the separator cutting step due to surrounding environments, vibration of the separator cutting device in the separator cutting step, and the like. If the difference between the distance D2 and the distance D1 is excessively less, a region having a distance less than 0.5 mm may occur in a partial region of the electrode assembly to cause the safety problem of the electrode assembly.

Thus, according to the present invention, the distance D2 may be greater than the distance D1. Here, a distance between the distances D2 and D1 may be 0.5 mm to 0.7 mm in all regions in which the cutting of the separator is performed. For example, a distance between the distances D2 and D1 may be 0.6 mm to 0.7 mm in all the regions of the electrode assembly.

Also, according to the present invention, the method for manufacturing the electrode assembly may further include a side sealing step of bonding the plurality of separators cut in the separator cutting step to each other. The plurality of separators cut in the separator cutting step may be bonded to each other to minimize a degree of protrusion of the separator to the outside, thereby minimizing a volume of the electrode assembly. In the side sealing step, the region in which the plurality of separators are bonded to each other may be limited to only the region in which the plurality of separators are cut. On the other hand, in the side sealing step, the region in which the plurality of separators are bonded to each other may include a region in which the plurality of separators are not cut in the separator cutting step.

The pre-sealing device may have a shape different from that of FIGS. 3 to 5. That is, each of the upper sealing device and the lower sealing device, which constitute the pre-sealing device, may have a shape corresponding to the region in which the separator is cut in the separator cutting step so as to cover the entire region in which the separator is cut in the separator cutting step. In this case, in the pre-sealing step, the pre-sealing part may be formed over the entire region in which the separator will be cut. However, in this case, each of one end of the upper pressing device and one end of the lower pressing device may have a shape corresponding to the electrode recess part to press the region adjacent to the electrode recess part 23 (see FIG. 2) of the electrode 2.

The technical effects of the numerical ranges in connection with the present invention may be supported by the following embodiments.

Hereinafter, an apparatus for manufacturing an electrode assembly according to the present invention will be described with reference to the above-described contents and the accompanying drawings.

Apparatus for Manufacturing Electrode Assembly

An apparatus for manufacturing an electrode assembly according to the present invention may include an electrode unit manufacturing device manufacturing an electrode unit 1 having a structure in which a separator 3 and an electrode 2 are alternately disposed, a pre-sealing device 110 which attaches at least partial regions of the plurality of separators within the electrode unit 1 to each other to form a pre-sealing part 40 and a separator cutting device which cuts a region of the plurality of separators 3, which includes the pre-sealing part 40.

Here, a concave part may be formed in the electrode 2, and the pre-sealing device 110 may form the pre-sealing part 40 on at least a portion of a region of the plurality of separators 3, which covers an electrode concave part 21 of the electrode 2. Also, the separator cutting device 120 may form a separator concave part 31 at a position of the separator 3, which corresponds to the electrode concave part 21 of the electrode 2.

The apparatus for the electrode assembly according to the present invention may further include a side sealing device which bonds the regions cut by the separator cutting device 120 to each other and a support device 130 supporting the electrode unit 1 and the pre-sealing part 40. The support device 130 may include a first support surface 132 supporting the bottom surface of the electrode unit 1 and a second support surface stepped with respect to the first support surface 132 and protruding upward to support the pre-sealing part 40.

The pre-sealing device 110 may include an upper pressing device 112 pressing the upper portion of the electrode unit 1 and a lower pressing device 114 pressing the lower portion of the electrode unit 1. Also, each of the upper pressing device 112 and the lower pressing device 114 may have a bar shape. One end of each of the upper pressing device 112 and the lower pressing device 114 may press a region of the separator 3, which is adjacent to the electrode concave part 21 of the electrode 2.

An electrode recess part 23 having a curved shape that is recessed toward the electrode 2 may be formed in the electrode concave 21 of the electrode 2. One end of each of the upper pressing device 112 and the lower pressing device 114 which press the region of the separator 3, which is adjacent to the electrode concave part 21 of the electrode 2 may have a curved surface having a curvature corresponding to that of the electrode recess part 23.

Embodiment

An electrode unit having a structure in which an electrode and a separator are alternately laminated and including 28 sheets of separators was prepared. The electrode unit was manufactured by laminating 14 mono cells, each of which includes two separators as a four-layered structure of a positive electrode, the separator, a negative electrode, and the separator.

The electrode unit had a total thickness of 3.42 mm, and each of the positive electrode and the negative electrode had an L shape. Also, a recess part was formed in each of concave parts of the positive electrode and the negative electrodes. Here, the recess part formed in the concave part of the negative electrode had a curvature radius of 4.5 mm.

In a pre-sealing step, each of the upper pressing device and the lower pressing device, which press the electrode unit, had a bar shape having a width of 5 mm. In the pre-sealing step, a pre-sealing part was formed in a region of the separator, which is pressed by the upper pressing device and the lower pressing device. Also, in the pre-sealing step, each of the one end of the upper pressing device and the one end of the lower pressing device, which press the region adjacent to the electrode recess part, had a curvature radius of 2.5 mm.

In the pre-sealing step, the upper pressing device and the lower pressing device moved downward and upward by a distance 1.5 mm for 1 second at a temperature of 120 degrees Celsius. Thereafter, the upper pressing device and the lower pressing device were stopped for 3 seconds. Thereafter, the upper pressing device and the lower pressing device moved upward and downward by a distance 1.5 mm for 1 second, respectively.

The pre-sealing part formed in the pre-sealing step had a thickness of 0.28 mm.

In a separator cutting step after the pre-sealing step, a partial region of the separator was cut so that the separator has a shape corresponding to that of the electrode. In the separator cutting step, the partial region of the separator was cut so that a horizontal distance (i.e., a distance between a circumferential portion of the negative electrode and a cutting line of the separator when the electrode unit is viewed from an upper side) between a circumferential portion of the negative electrode and a cutting line of the separator is 1.1 mm. Here, a region of the separator cutting line, which corresponds to the recess part of the negative electrode had a curvature radius of 3.4 mm.

Total eight electrode assemblies were measured according to Embodiment.

Experimental Example

In the eight electrode assemblies manufactured according to Embodiment, a horizontal distance between a circumferential portion of a separator and a circumferential portion of a negative electrode in a region of the separator, which is cut in a separator cutting step, was measured.

Figure 9:
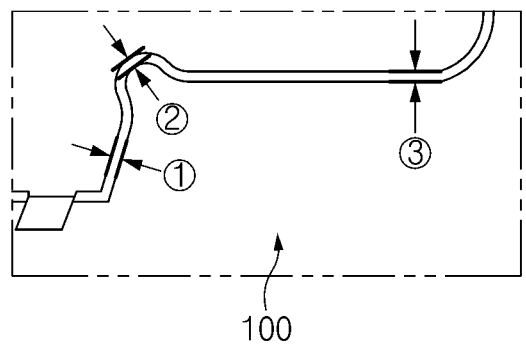
FIG. 9 is a plan view illustrating a point at which a horizontal distance between a circumferential portion of the separator and a circumferential portion of a negative electrode is measured through an experimental example with respect to the electrode assembly manufactured according to an embodiment of the prevent invention.
Figure 10:
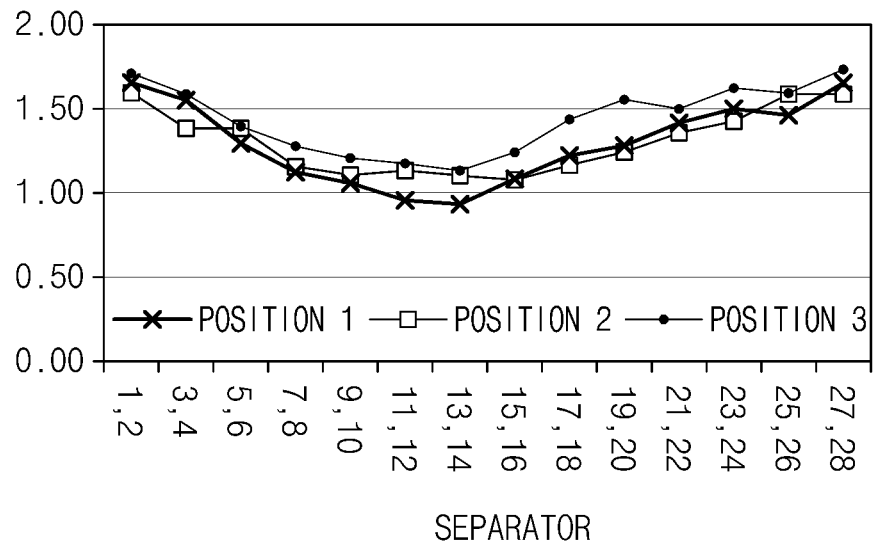
FIG. 10 is a graph view illustrating results obtained by measuring the horizontal distance between the circumferential portion of the separator and the circumferential portion of the negative electrode through the experimental example with respect to the electrode assembly manufactured according to an embodiment of the prevent invention.

As illustrated in FIG. 9, the horizontal distance between the circumferential portion of the separator and the circumferential portion of the negative electrode in the region in which the separator is cut was measured in a first circumferential region ① of a concave part of the electrode and the separator, a recess part region ②, and a second circumferential region ③ of the concave part of the electrode and of the separator. The horizontal distance between the circumferential portion of the separator and the circumferential portion of the negative electrode was measured with respect to 28 separators, which constitute the electrode assembly manufactured according to Embodiment. FIG. 10 is a graph view illustrating results obtained by measuring the horizontal distance between the circumferential portion of the separator and the circumferential portion of the negative electrode in the regions ① to ③ with respect to each of the 28 separators constituting the electrode unit manufactured according to Embodiment. Numbers expressed on a horizontal axis indicate positions of the separators sequentially measured from the uppermost end in a thickness direction of the electrode unit. Here, the separators are listed in pairs by 1, 2/3, 4/5, 6 . . . (abbreviated below) on the horizontal axis of FIG. 10. This means that the horizontal distance between the entire circumferential portion of two separators and the circumferential portion of the negative electrode, which constitute one mono cell, was measured. That is, in the regions ① to ③ of the electrode unit including 28 sheets of separators according to Embodiment, a horizontal distance between the entire circumferential portion of the two sheets of separators within one mono cell and the circumferential portion of the negative electrode within the mono cell to which the two sheets of separators belong was measured for each mono cell (i.e., measured 14 times in each of the regions ① to ③ to measure the distance between the circumferential portion of the separator and the circumferential portion of the negative electrode, and the results are shown in FIG. 10.

In order to ensure safety of the manufactured electrode assembly, the distance between the circumferential portion of the separator and the circumferential portion of the negative electrode needs to be 0.5 mm or more in all the regions of the electrode assembly. Therefore, as illustrated in FIG. 10, in the case of the electrode assembly manufactured according to Embodiment, it was confirmed that the distance between the circumferential portion of the separator and the circumferential portion of the negative electrode is 0.5 mm or more in the entire region, which is cut in the separator cutting step.

TABLE 1

| | Position | Region ① | Region ② | Region ③ |
|---|---|---|---|---|
| Measurement Value | Mean Distance | 1.17 | 1.25 | 1.20 |
| | Maximum Distance | 1.76 | 1.69 | 1.64 |
| | Minimum Distance | 0.73 | 0.94 | 0.73 |
| | Standard Deviation | 0.24 | 0.17 | 0.20 |
| | Process Capability Index (Cpk) | 1.90 | 2.93 | 2.17 |

Table 1 shows a mean value, a maximum value, a minimum value, a standard deviation, and a process capability index (CpK) with respect to the horizontal distance between the circumferential portion of the separator and the circumferential portion of the negative electrode in the regions ① to ③ with respect to all the separators of the eight electrode assemblies manufactured according to Embodiment. In Table 1, similar to the case of FIG. 8, in the case of the electrode assembly manufactured according to Embodiment, it is confirmed that the distance between the circumferential portion of the separator and the circumferential portion of the negative electrode is 0.5 mm or more in the entire region, which is cut in the separator cutting step, to ensure the safety of the electrode assembly.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing an electrode assembly, the method comprising:
    a preparation step of preparing a plurality of separators and a plurality of electrodes;
    an electrode unit manufacturing step of manufacturing an electrode unit having a structure in which the separators and the electrodes are alternately disposed;
    a pre-sealing step of forming a pre-sealing part in which at least a partial region of each separator of the plurality of separators within the electrode unit are attached to each other; and
    a separator cutting step of cutting a region of the pre-sealing part,
    wherein, in the preparation step, a concave part is formed in each electrode of the plurality of electrodes,
    wherein, in the pre-sealing step, the pre-sealing part is formed on at least a portion of the plurality of separators covering the concave parts of the plurality of electrodes, wherein, in the separator cutting step, a concave part is formed in each separator of the plurality of separators, the concave parts of the plurality of separators corresponding to the concave parts of the plurality of electrodes, wherein, in the pre-sealing step, upper and lower portions of the electrode unit are pressed at the same time to form the pre-sealing part, wherein, in the pre-sealing step, an upper pressing device and a lower pressing device, each having a bar shape, are provided, and one end of each of the upper pressing device and the lower pressing device presses a region of the plurality of separators adjacent to the concave parts of the plurality of electrodes, wherein a recess part having a recessed shape is formed in each of the concave parts of the plurality of electrodes, and wherein, in the pre-sealing step, each of the one ends of the upper pressing device and the lower pressing device has a curved surface having a curvature corresponding to that of the recess parts of the concave parts of the plurality of electrodes.

2. The method of claim 1, further comprising a side sealing step of bonding the plurality of separators cut in the separator cutting step to each other.

3. The method of claim 1, wherein the separator cutting step is performed in a state in which the pre-sealing part is disposed to be spaced downward from a virtual surface extending from an uppermost surface of the electrode unit and is disposed to be spaced upward from a virtual surface extending from a lowermost surface of the electrode unit.

4. The method of claim 1, wherein, in the pre-sealing step, the upper pressing device presses an upper portion of the electrode unit while moving downward from an upper side of the electrode unit toward a center of the electrode unit in a thickness direction, and the lower pressing unit presses a lower portion of the electrode unit while moving upward from a lower side of the electrode unit toward the center of the electrode unit in the thickness direction.

5. An apparatus for manufacturing an electrode assembly, the apparatus comprising:

an electrode unit manufacturing device configured to manufacture an electrode unit having a plurality of separators and a plurality of electrodes where the separators and electrodes are alternately disposed;

a pre-sealing device configured to attach at least a partial region of each separator of the plurality of separators within the electrode unit to each other to from a pre-sealing part; and a separator cutting device configured to cut a region of the pre-sealing part, wherein each electrode of the plurality of electrodes includes a concave part, wherein, the pre-sealing device is configured to form the pre-sealing part on at least a portion of the plurality of separators covering the concave parts of the plurality of electrodes, wherein, the separator cutting device is configured to form a concave part in each separator of the plurality of separators, the concave parts of the plurality of separators corresponding to the concave parts of the plurality of electrodes, wherein the pre-sealing device comprises:
  an upper pressing device configured to press an upper portion of the electrode unit; and
  a lower pressing device configured to press a lower portion of the electrode unit, wherein each of the upper pressing device and the lower pressing device has a bar shape, wherein one end of each of the upper pressing device and the lower pressing device is configured to press a region of the plurality of separators adjacent to the concave parts of the plurality of electrodes, wherein a recess part having a recessed shape is formed in each of the concave parts of the plurality of electrodes, wherein each of the one ends of the upper pressing device and the lower pressing device has a curved surface having a curvature corresponding to that of the recess parts of the concave parts of the plurality of electrodes.

6. The apparatus of claim 5, further comprising a side sealing device configured to bond the plurality of separators cut by the separator cutting device to each other.

7. The apparatus of claim 5, further comprising a support device to support the electrode unit and the pre-sealing part, the support device comprising:

a first support surface supporting a bottom surface of the electrode unit; and a second support surface stepped with respect to the first support surface and protruding upward to support the pre-sealing part.

8. The apparatus of claim 5, wherein the upper pressing device is configured to press the upper portion of the electrode unit while moving downward from an upper side of the electrode unit toward a center of the electrode unit in a thickness direction, and the lower pressing unit is configured to press the lower portion of the electrode unit while moving upward from a lower side of the electrode unit toward the center of the electrode unit in the thickness direction.

* * * * *